United States Patent [19]

Hill et al.

[11] Patent Number: 5,117,367
[45] Date of Patent: May 26, 1992

[54] CUTTING MACHINE

[76] Inventors: Harry A. Hill, 7 Woodhall Close, Durkar, Wakefield, WF4 3HU; David Hagon, 99 Birchwood Hill, Leeds, LS17 8NT, both of England

[21] Appl. No.: 579,429

[22] Filed: Sep. 7, 1990

[30] Foreign Application Priority Data

Sep. 9, 1989 [GB] United Kingdom ............. 8920426

[51] Int. Cl.$^5$ .................... G06F 15/46; B23D 25/04
[52] U.S. Cl. ................... 364/474.09; 83/74; 83/76.8; 83/295; 83/320
[58] Field of Search ............ 364/474.09, 174; 83/37, 83/38, 54, 76, 76.6, 76.7, 76.8, 295, 299, 300, 318, 319, 320, 321, 322, 72, 74, 311

[56] References Cited

U.S. PATENT DOCUMENTS

| | | | |
|---|---|---|---|
| 1,996,617 | 4/1935 | Hahn | 164/49 |
| 3,614,572 | 10/1971 | Usher | 83/295 X |
| 3,641,856 | 2/1972 | Levy | 83/295 |
| 4,090,118 | 5/1978 | Smith, Jr. | 83/295 X |
| 4,191,078 | 3/1980 | Steinhilber | 83/320 |
| 4,614,139 | 9/1986 | Borzym | 83/300 |
| 4,739,490 | 4/1988 | Hayashi et al. | 83/320 X |

FOREIGN PATENT DOCUMENTS

| | | |
|---|---|---|
| 2535978 | 7/1976 | Fed. Rep. of Germany . |
| 2739327 | 3/1979 | Fed. Rep. of Germany . |
| 1600829 | 10/1981 | United Kingdom . |

Primary Examiner—Joseph Ruggiero

[57] ABSTRACT

A machine for cutting lengths of strip or tube from a moving length of strip or tube includes a carriage reciprocable in the direction of movement of the strip and mounting a cutter mechanism operable to sever the strip. The carriage is driven by a motor through a crank mechanism having a rotary input member. The motor speed is controlled so that during a substantial portion of one revolution of the input member the motor speed is constant and during the remaining portion of the one revolution the motor speed is controlled so that the linear speed of the carriage corresponds to that of the strip to be cut. During the latter period the motor speed is controlled in accordance with a plurality of secant values contained in a map.

9 Claims, 4 Drawing Sheets

CUTTING MACHINE

This invention relates to a machine for cutting lengths of strip or tube from a moving length of strip or tube as may be produced in a continuous manner by for example a strip or tube mill.

It is known to effect cutting of strip or tube using a cutter which is mounted upon a reciprocable carriage movable along a path parallel to the moving length of strip or tube. At the instant at which the strip or tube is cut the speed of the carriage and the cutter should be equal to the speed of the moving length of strip or tube so that a clean cut can be obtained.

The object of the invention is to provide a machine for the purpose specified in a simple and convenient form.

According to the invention a machine for the purpose specified comprises a reciprocable carriage means movable along a path parallel to the direction of movement of the strip or tube, a cutter mechanism mounted on the carriage means, a crank mechanism including a rotary input member, a drive motor coupled to said input member so that the carriage will be reciprocated along said path, an electronic control system responsive to at least the linear speed of the moving length of strip or tube and the rotational speed of the input member, said control system acting to control the speed of said motor whereby for a substantial portion of one revolution of the rotary input member, its speed is constant and for the remainder of the revolution of the input member the speed of the input member is varied in a manner so that the linear speed of the carriage is substantially equal to the linear speed of the length of strip or tube and means for actuating the cutter mechanism whilst the linear speeds are substantially equal.

According to a further feature of the invention the cutter mechanism includes a pair of blades mounted upon a movable support, the support being movable in one direction to sever one length of strip or tube and in the opposite direction to sever the next length of strip or tube.

An example of a machine in accordance with the invention will now be described with reference to the accompanying drawings in which.

Figure 1:
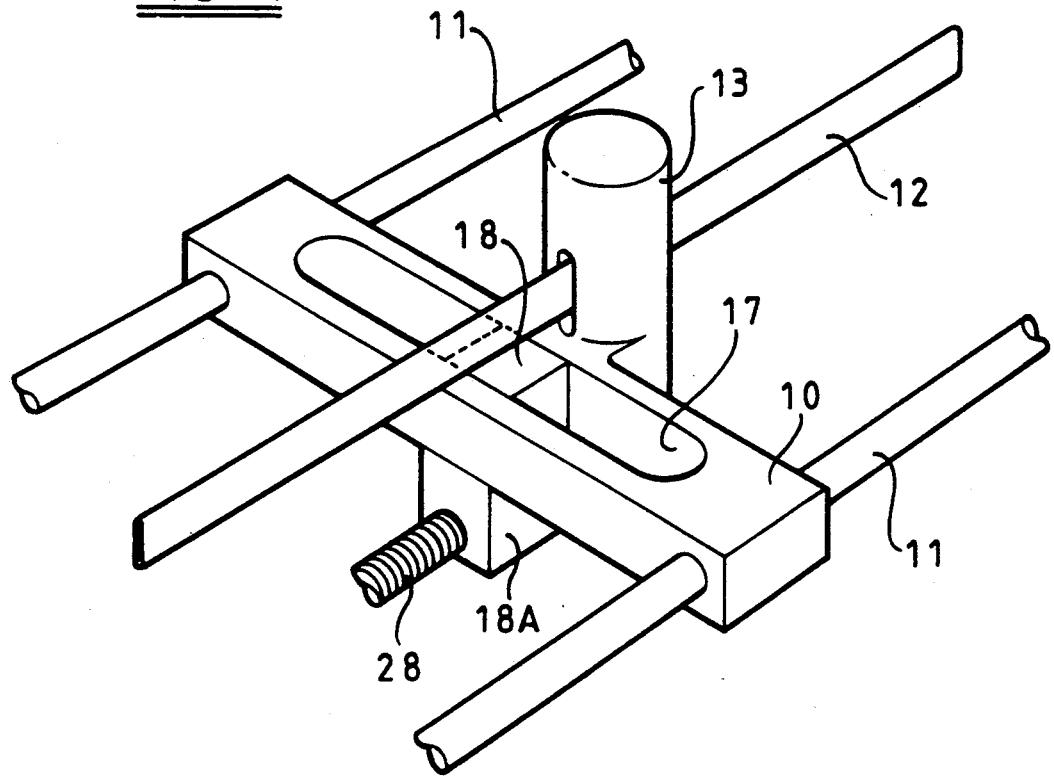
FIG. 1 is a perspective view of part of the machine.

Referring to FIG. 1 the machine comprises a reciprocating carriage 10 mounted on a pair of guide rails 11 which extend parallel to but spaced from the path of movement of in the example, tube stock 12, the tube stock being flattened and of thin wall section for use in heat exchangers. The tube is produced in a continuous length in a tube mill (not shown). The path of the tube extends above the carriage and the tube passes through a cutter housing 13 mounted on the carriage.

Figure 2:
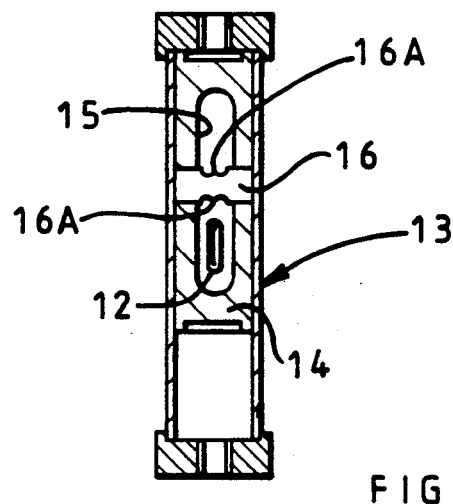
FIG. 2 is a sectional view of part of the machine seen in FIG. 1.
Figure 3:
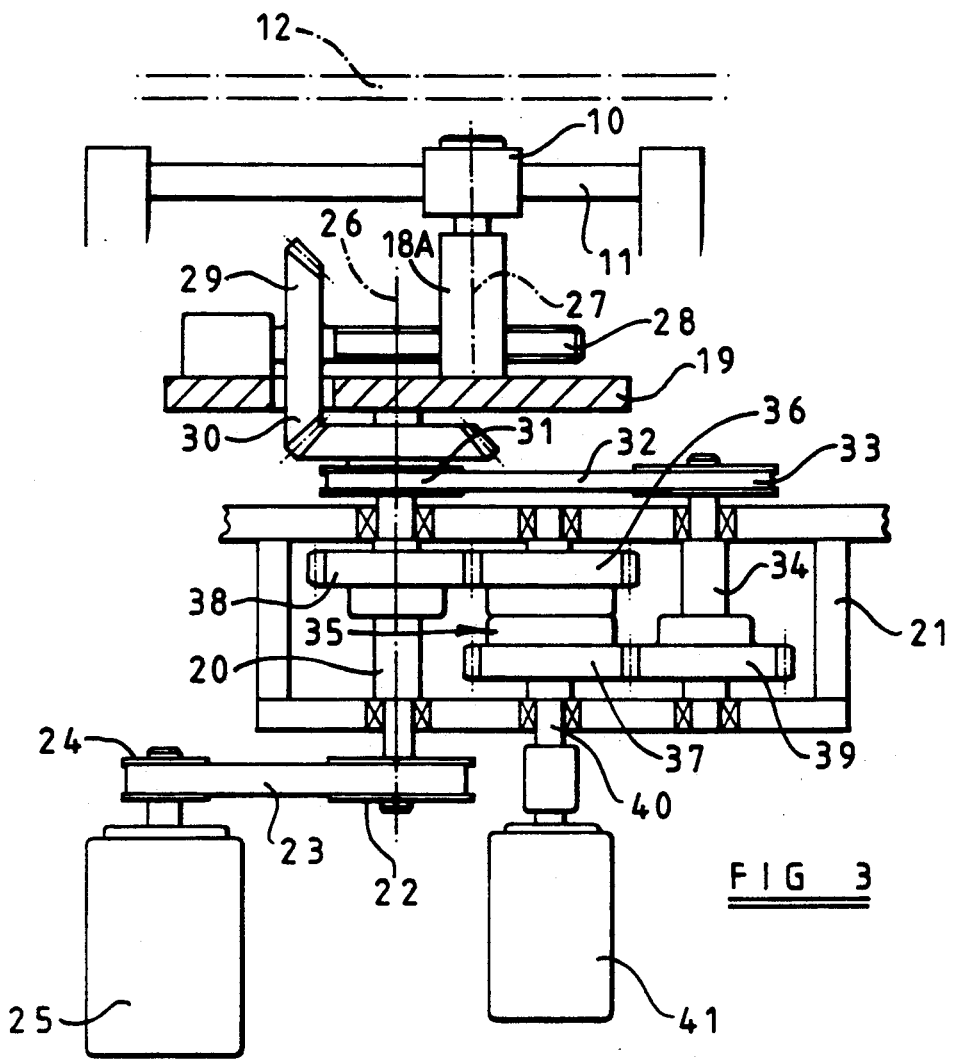
FIG. 3 is a diagrammatic side elevation of part of the machine.
Figure 4:
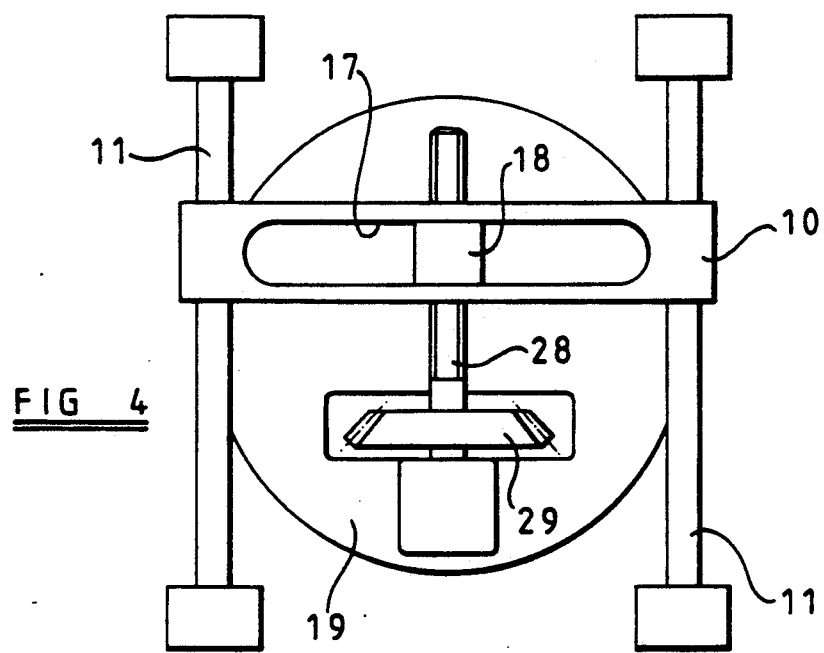
FIG. 4 is a plan view of a further part of the machine.

Within the cutter housing there is mounted as shown in FIG. 2, a blade support 14 in the form of a double acting piston slidable in a cylinder defined by the housing. Air under pressure can be admitted to the opposite ends of the cylinder to urge the piston to the opposite ends of the cylinder by actuation of valves not shown. In the piston there is formed an elongated slot 15 through which extends the tube 12 and traversing the slot is a cutter blade 16 the opposite side edges of which define cutting edges. It will be appreciated that each time the piston is moved from one end of the cylinder to the opposite end, the tube 12 will be severed.

The carriage 10 is driven by a crank mechanism which term should be taken to include the so-called "scotch yoke" type of mechanism. As shown in FIG. 1 the carriage is formed with a transverse slot 17 in which is slidably mounted a block 18 which is mounted on a crank pin carried on a further block 18A adjustably mounted on a rotary input member 19. The input member is mounted on a shaft 20 carried in a support structure 21 and the shaft mounts a toothed pulley 22 which by means of a toothed drive belt 23, is connected to a further toothed pulley 24 driven by a variable speed drive motor 25. The axis of rotation of the drive shaft is indicated at 26 and the axis of the block 18 is indicated at 27 and the spacing of these axes determines the extent of movement of the carriage as the input member is rotated.

The spacing of the axes 26, 27 is adjustable during operation of the machine and for this purpose the block 18A is provided with a screw threaded bore in which is engaged a threaded shaft 28 mounted against axial movement, on the input member 19. The shaft 28 can be rotated by a bevel gear 29 which is engaged with an identical bevel gear 30 rotatably mounted about the shaft 20. The bevel gear 30 is coupled to a pulley 31 which in turn is coupled by a belt 32 to a pulley 33 mounted upon a further shaft 34 supported for rotation in the support structure 21. Mounted in the support structure is a harmonic drive unit 35 which has drive transmitting gears 36, 37 meshing with gear wheels 38, 39 respectively secured about the shafts 20 and 34. The harmonic drive unit has an input shaft 40 which is driven by a drive motor 41.

In operation, when the motor is driven, the carriage will be reciprocated in the usual manner of a crank mechanism and will undergo acceleration and deceleration in a sinusoidal manner. Providing the motor 41 is not driven, there will be no rotation of the threaded shaft 28 since the bevel gear 30 will be rotating at the same speed as the input member. If however the motor is driven in either direction there will be a speed difference between the bevel gear 30 and the input member so that the shaft 28 will rotate to move the axis 27 nearer to or further away from the axis of rotation of the input member. As a result the extent of movement of the carriage will be varied. Adjustment of the extent of movement of the carriage can therefore be carried out whilst the machine is in operation as well as when it is at rest.

In order to avoid damage to the cutting blades 16A and also to ensure a precise cut, the carriage at the instant of operation of the cutter bar, must be moving at the same speed as the tube. The speed of the motor 25 is therefore adjustable and for this purpose an electronic control system is provided. The control system receives inputs from encoders one of which provides a digital signal representing the speed of rotation of the shaft 20 and the other of which provides a digital signal representing the speed of the moving tube 12.

The average speed of rotation over one revolution of the shaft 20 must be linked to the desired length of tube and the actual linear speed of the tube but during the cutting operation the linear speed of the carriage must be equal to the linear speed of the tube. In order to achieve this object the motor 25 is rotated at a constant speed throughout a substantial part of one revolution and its speed is varied for the remaining portion of the revolution. In the example the speed of the motor is constant for 270° and is varied during the remaining 90° of one revolution. The constant speed value is calculated using the signals from the aforesaid encoders and knowing the required length of tube and the varying speed is determined from the constant speed value by using a "map" of secant values.

The torque which can be developed by the motor 25 to achieve the change of speed is limited and assistance in this respect can be provided by the motor 41 which when operated, alters the effective crank radius. The motor 41 is also brought into operation when the cut length of the tube is changed. When the operator requires a different length of tube, the motor 41 is operated so that the block is moved to the new position and the feedback signal of the actual radius is used as a reference value for determining the average speed. It will be appreciated that if a change of cut length is signalled whilst the machine is operating, several lengths of tube may be cut before the desired length is attained.

The valves which control the application of air or fluid to the cylinder containing the piston 14 may be electromagnetic valves. Since the piston is in effect double acting there is adequate time for the valves to operate. The piston may be replaced by a plunger actuated by an electro-magnetic device.

Since designing the machine shown in FIG. 1 more powerful motors have become available the motors being of the AC brushless type making it possible to use a single drive motor which results in considerable simplification of the driving arrangement for the carriage.

Figure 5:
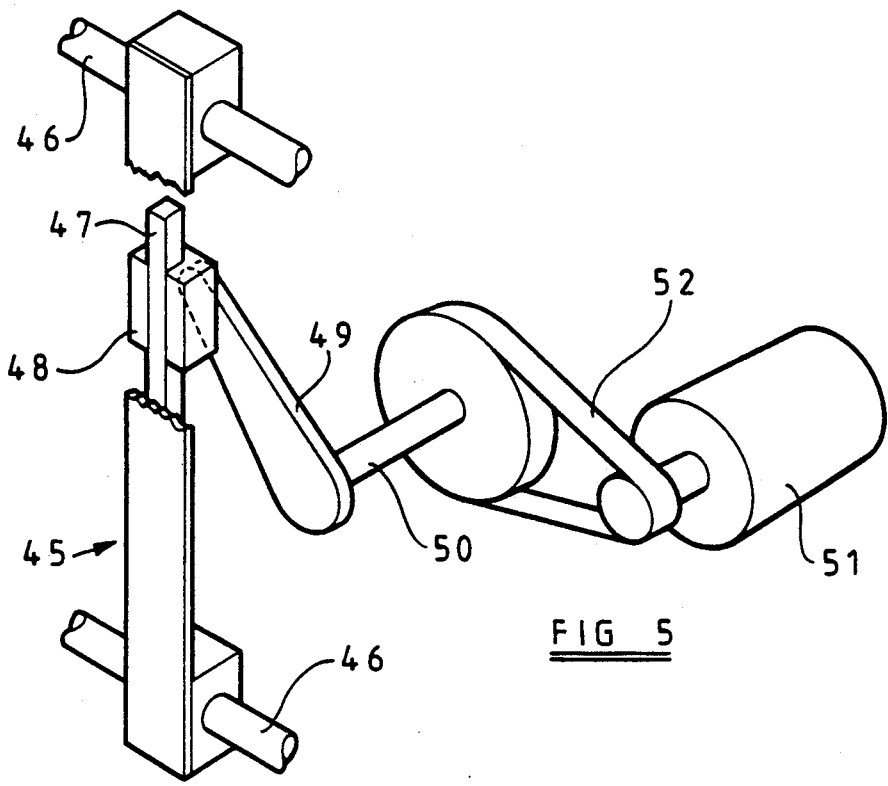
FIG. 5 is a perspective view of a modified portion of the machine.

A modified form of the machine is shown in FIG. 5 and this utilises a single drive motor. As shown in FIG. 5 part of the carriage is seen at 45 and is movable along guide rails 46. The carriage carries a slide 47 upon which is slidable a linear bearing 48 which is coupled to the free end of a rotary crank arm 49 which is carried by a drive shaft 50. The drive shaft is coupled to the drive motor 51 by means of a transmission conveniently employing a toothed belt 52. The motor 51 is controlled in the same way as the motor 25 of the example of FIG. 1 except that in this case the motor is able to cope with the changes of speed necessary to enable widely varying length of cut tube to be produced.

Figure 6:
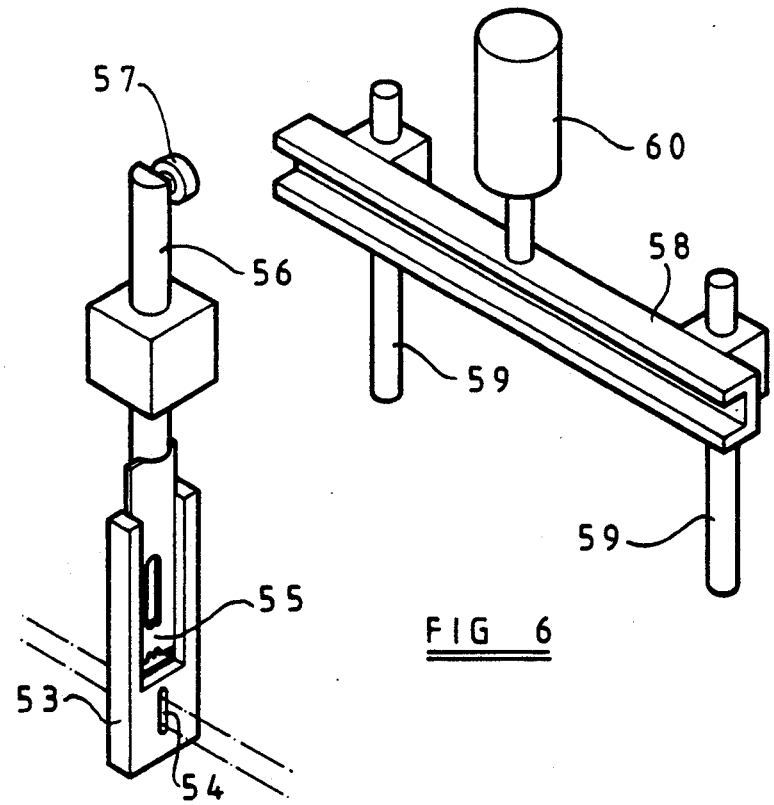
FIG. 6 is a perspective view of a modification to a further part of the machine.

The carriage 45 can carry the form of cutter mechanism seen in FIG. 2, however, an alternative form of cutter mechanism as shown in FIG. 6 can be employed and with reference to FIG. 6 the cutter mechanism comprises a die block 53 which is mounted on the carriage 45 the die block having an aperture 54 through which the tube to be cut passes. Slidable in the die block is a cutter blade 55 the lower edge of which defines a cutting edge. The blade is also provided with an elongated aperture at the lower end of which is formed a further cutting edge, the two cutting edges of the blade facing in opposite directions. The blade is secured to the lower end of an actuating rod 56 at the upper edge of which is mounted a roller 57 having its axis of rotation extending normal to the direction of movement of the carriage. The roller is located in a track 58 which is vertically movable on a pair of spaced supports 59 mounted on a fixed part of the machine. As the carriage is moved along the guide rails 46 the roller moves within a channel defined by the track. Movement of the track 58 on the supports 59 will cause the blade to move within the die block and this movement is achieved using a double acting piston cylinder combination 60. Movement of the blade 55 downwardly will sever the tube within the die block and the uncut tube will pass through the elongated aperture in the blade to be severed as the blade is moved upwardly.

Figure 7:
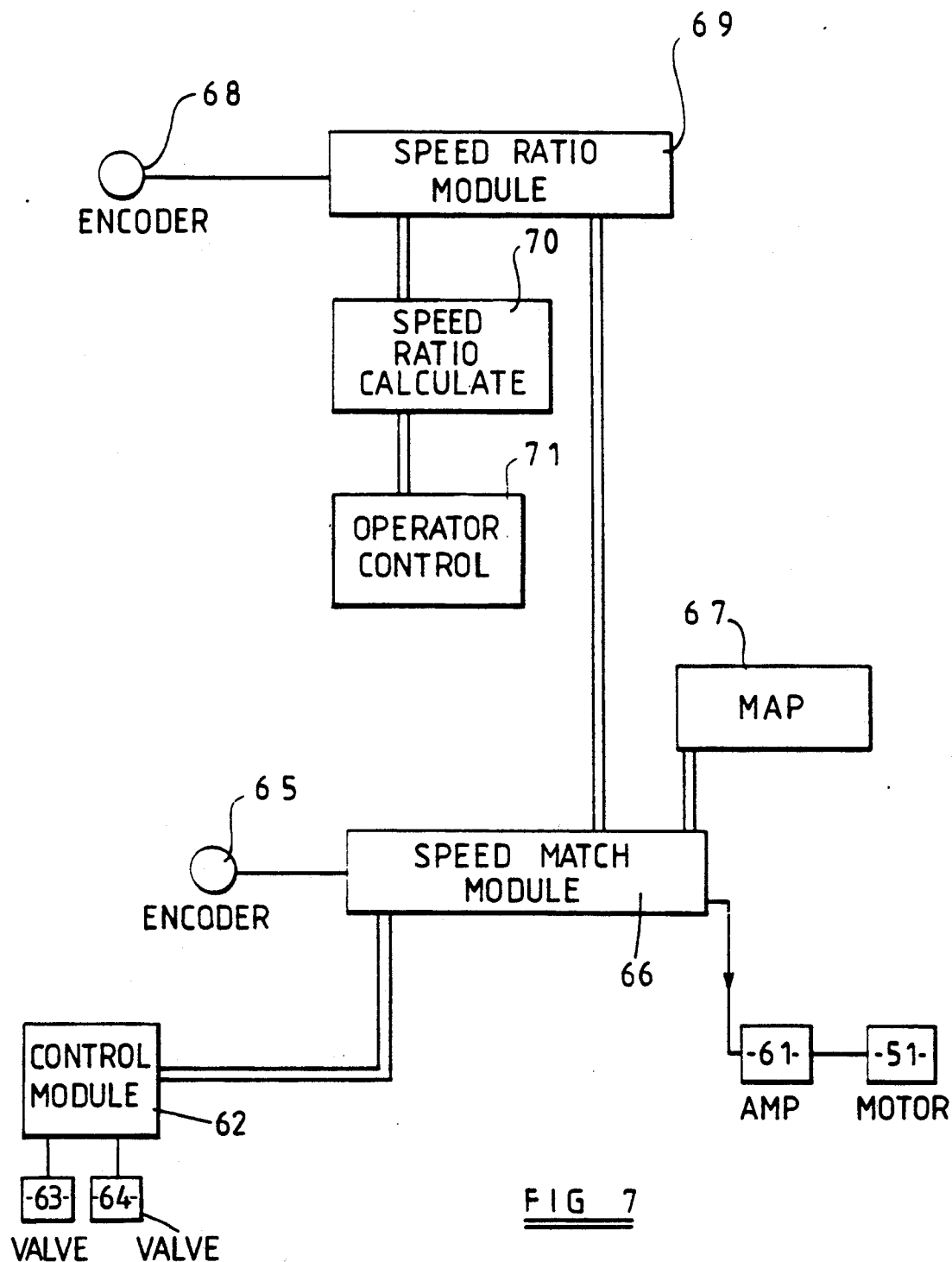
FIG. 7 is a block diagram showing one example of a control system.

An example of the control system for use with the machine illustrated in FIG. 5 is shown in block form in FIG. 7, the system being constructed as a plurality of printed circuit cards. The control system includes a motor drive amplifier 61 and a control module 62 for a pair of high speed electromagnetic valves 63, 64 which control the application of air under pressure to the opposite ends of the piston/cylinder combination 13 or 60. An encoder 65 provides a signal indicative of the speed and also the angular position of the drive shaft 50. The output signal of the encoder 65 is supplied to a so called speed match module 66 the purpose of which is to match the speed of the carriage with that of the tube being cut over a period of time (90°) considered in terms of degrees of rotation of the drive shaft 50 during which time the cutter is actuated to sever the tube. In practice the cutter is actuated at a predetermined angular position of the shaft. During the remaining period (270°) of time the motor is driven at a constant speed so that the motion of the carriage is a simple harmonic motion.

In order to control the speed of the motor 51 during the 90° period of time, the speed match module 66 makes use of information stored in a map 67 of secant values.

The length of the tube which is severed upon operation of the cutters is determined by the speed of movement of the tube and the time for one revolution of the drive shaft 50. Since it is required to construct the machine so that the length of severed tube can be varied the average speed of the drive shaft can be controlled. An encoder 68 provides a digital signal indicative of tube speed to a so called speed ratio module 69 which is interconnected by a data path with a speed ratio calculating module 70. This receives a desired tube length signal from an operator control 71. The required speed ratio as calculated by the module 70, is maintained by the speed ratio module during the aforesaid 270° degrees of rotation of the drive shaft. During the 90° rotation of the shaft the motor speed is modified by operation of the speed match module 66 to achieve equality of the speed of linear movement of the tube and the carriage. The change over between the control of the motor speed by the module 69 and the module 66 and vice versa is achieved using sine law ramps to avoid excessive torque and possible judder and instability.

We claim:

1. A machine for cutting lengths of strip or tube from a moving length of strip or tube comprising:

a reciprocable carriage means movable along a path parallel to the direction of movement of the strip or tube, a cutter mechanism mounted on the carriage means, a crank mechanism including a rotary input member, a drive motor coupled to said input member, so that the carriage means will be reciprocated along said path, and means for actuating said cutter mechanism during the time when the linear speed of the carriage means is substantially equal to the linear speed of the strip or tube, an electronic control system for controlling the speed of the drive motor; and encoder means for providing signals to the control system indicative of the speed and position of the input member and the speed of the strip or tube respectively, the control system acting to control the speed of the motor whereby for a substantial portion of one revolution of the input member, the motor speed is constant and for the remainder of the revolution of the input member, the speed of the input member is varied so that the linear speed of the carriage means is substantially equal to the linear speed of the strip or tube.

2. A machine according to claim 1 in which the electronic control system includes a map of secant values, the speed of the input member during said remainder of the revolution being controlled by reference to said map.

3. A machine according to claim 2 in which said motor is an A.C. brushless motor.

4. A machine according to claim 2 in which said electronic Control system includes a speed ratio module which acts to control the speed of the motor during said substantial portion of one revolution of the input member, in accordance with a predetermined ratio of the signals provided by said encoder means.

5. A machine according to claim 4 including means for determining and varying said ratio to enable the cut length of the strip or tube to be varied.

6. A machine according to claim 1 in which said cutter mechanism includes a die block and a cutter blade slidable in the die block and an actuating mechanism for the blade mounted on a fixed part of the machine.

7. A machine according to claim 6 in which said blade is mounted on an actuating rod, a roller carried by said actuating rod, said roller being engaged within a channel defined by a track extending in the direction of movement of the carriage means, the track being movable to actuate said blade by said actuating mechanism.

8. A machine according to claim 1 in which said crank mechanism includes a crank pin, and means for adjusting the distance between the axis of the crank pin and the axis of rotation of the input member.

9. A machine according to claim 8 in which adjustment means includes a further motor.

* * * * *

UNITED STATES PATENT AND TRADEMARK OFFICE
CERTIFICATE OF CORRECTION

PATENT NO. : 5,117,367
DATED : May 26, 1992
INVENTOR(S) : Harry A. Hill et al.

It is certified that error appears in the above-identified patent and that said Letters Patent is hereby corrected as shown below:

On the title page, before "[21] Appl. No.:" insert

--[73] Assignee: The Fin Machine Co. Ltd., West Yorkshire, England--.

Signed and Sealed this

Seventh Day of December, 1993

Attest:

BRUCE LEHMAN

Attesting Officer

Commissioner of Patents and Trademarks